(12) United States Patent
Moore et al.

(10) Patent No.: US 6,223,180 B1
(45) Date of Patent: Apr. 24, 2001

(54) SYSTEM AND COMPUTER-IMPLEMENTED METHOD FOR TRANSFORMING EXISTING HOST-BASED SCREEN APPLICATIONS INTO COMPONENTS USEFUL IN DEVELOPING INTEGRATED BUSINESS-CENTRIC APPLICATIONS

(75) Inventors: Jeffrey Allen Moore, Mission Viejo; Shelby Kiyee Seid, Los Angeles; Joseph Peter Stefaniak, San Clemente, all of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/183,204

(22) Filed: Oct. 30, 1998

(51) Int. Cl.$^7$ ...................................................... G06F 17/30
(52) U.S. Cl. ............................ 707/100; 707/102; 707/200
(58) Field of Search ...................... 707/1–5, 10, 100–104, 707/200–206; 709/219; 345/327, 333; 711/202; 705/500; 713/1, 2

(56) References Cited

U.S. PATENT DOCUMENTS

| | | | | |
|---|---|---|---|---|
| 5,754,938 | * | 5/1998 | Herz et al. | 455/4.2 |
| 5,754,939 | * | 5/1998 | Herz et al. | 455/4.2 |
| 5,826,265 | * | 7/2000 | Van Huben et al. | 707/8 |
| 5,835,087 | * | 11/1998 | Herz et al. | 345/327 |
| 5,920,873 | * | 7/1999 | Van Huben et al. | 707/202 |
| 5,974,413 | * | 10/1999 | Beauregard et al. | 707/6 |
| 5,978,804 | * | 2/2000 | Dietzman | 707/10 |
| 6,026,474 | * | 2/2000 | Carter et al. | 711/202 |
| 6,029,195 | * | 2/2000 | Herz | 709/219 |
| 6,088,693 | * | 7/2000 | Van Huben et al. | 707/8 |
| 6,094,654 | * | 7/2000 | Van Huben et al. | 707/8 |

* cited by examiner

Primary Examiner—Ruay Lian Ho
(74) Attorney, Agent, or Firm—Alfred W. Kozak; Mark T. Starr; Rocco L. Adornato

(57) ABSTRACT

A system and method in a computer system having coupled thereto a repository for storing data, which method is implemented by the computer system. The method encodes display, entry fields and static text of a screen application (screen data) into Host Reply Definition (HRD), Request (REQ) and recognition files, which are then stored in the repository. A graphical user interface program is used for building and transforming the HRD, REQ and files stored in the repository into components. Next, the HRD, REQ and recognition files are extracted from the repository and associated with the screen application. The attributes of these files are written into a type library, thereby forming the software components. After this, the recognition file is stored in a directory structure independent of the repository. Finally, the components are registered in a registry for recognition by other applications and components.

18 Claims, 7 Drawing Sheets

SYSTEM AND COMPUTER-IMPLEMENTED METHOD FOR TRANSFORMING EXISTING HOST-BASED SCREEN APPLICATIONS INTO COMPONENTS USEFUL IN DEVELOPING INTEGRATED BUSINESS-CENTRIC APPLICATIONS

CROSS REFERENCE TO RELATED APPLICATIONS

This application relates to the following co-pending application, assigned to the same assignee hereof, the texts of which is incorporated herein by reference.

U.S. Ser. No. 09/183,203, entitled A SYSTEM AND COMPUTER-IMPLEMENTED METHOD FOR PROVIDING ACCESS TO HOST-BASED SCREEN APPLICATIONS FROM BUSINESS-CENTRIC SOFTWARE COMPONENTS.

FIELD OF THE INVENTION

The present invention generally relates to the field of computer systems for developing business applications; and, in particular, it relates to a system and computer-implemented method for building and transforming legacy screens on a host application being executed on a host mainframe into software components useful in developing business-centric applications.

BACKGROUND OF THE INVENTION

The software industry has seen great advances in distributed computing from both a client/server and software modeling perspective. The move towards network-centric computing, using the client/server architecture of the Internet, coupled with new software tools and component-based models, equip today's software developer with a distributed, object-oriented, infrastructure that affords ease of access and manipulation of business data.

In the early nineties, as client-server computing emerged; more advanced software solutions introduced more intelligent links among clients and servers. Although it represents an improvement over earlier models, client-server computing still suffers from a number of drawbacks. For example, since information carried between clients and servers is usually transmitted over a proprietary protocol, each user tends to implement a closed solution, i.e., a solution that works only for the product of that user.

In the current scenario, distributed component-based development and enabling solutions are changing the way information is discovered, built, managed and delivered. Organizations are investing in component-based technologies because they cannot afford to ignore the reductions in costs that the new technology offers. As a method for delivering information to large numbers of end-users, the iterative process of building and deploying components are appealing when compared with the alternative of configuring every end-user system with application-specific client applications.

A reduction in the overall costs is just one benefit. Other benefits include access to larger amounts of enterprise information for connecting the organization, delivering solutions and keeping pace with end-user demands, and being able to take advantage of ever changing technology more effectively. Effective business processes require information, and the objective for the Information System (IS) organizations is to ensure that the required information is available when it is needed.

An example of a prior art method is disclosed in U.S. Pat. No. 5,815,149, entitled METHOD FOR GENERATING CODE FOR MODIFYING EXISTING EVENT ROUTINES FOR CONTROLS ON A FORM, by Eugene Mutschler, et al, and assigned to the assignee hereof. This patent teaches a method for converting existing forms of legacy programs into a more modern and widely-used format. The present invention on the other hand, discloses and claims an improvement over what is taught in this patent by rendering those legacy forms into object oriented data format for use in any distributed object oriented business process development framework.

The present invention re-uses existing business assets in new component-based paradigms. It employs a method that enhances the efficiency of the current technology and reduces its drawbacks.

SUMMARY OF THE INVENTION

The method and system of the present invention solves the problems of the prior art by creating several components that are useful for transforming and re-using the assets of an enterprise application (specifically, 3GL screen based applications). The method of the present invention increases the efficiency of a computer system and development process by allowing the resulting component to be modeled in various modeling tools for the purpose of further analysis of the business and business-centric application development process.

It is an object of the present invention to provide a method for supporting component-based development.

Another object of the present invention is to provide a method for supporting the transformation of enterprise assets into components that can be accessed with the use of the new component model technologies.

Yet another object of the present invention is the provision of a method that supports business-centric development by permitting inclusion of transformed components into modeling tools for further analysis and design.

A feature of the present invention resides in the provision of procedures that permit the selective transformation of enterprise assets.

Another feature of the present invention is the capability of allowing developers to control the automated component development process, thereby creating a component-based technology that caters to system needs while being open in nature, i.e. being adaptable to any distributed component based system.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by letters patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
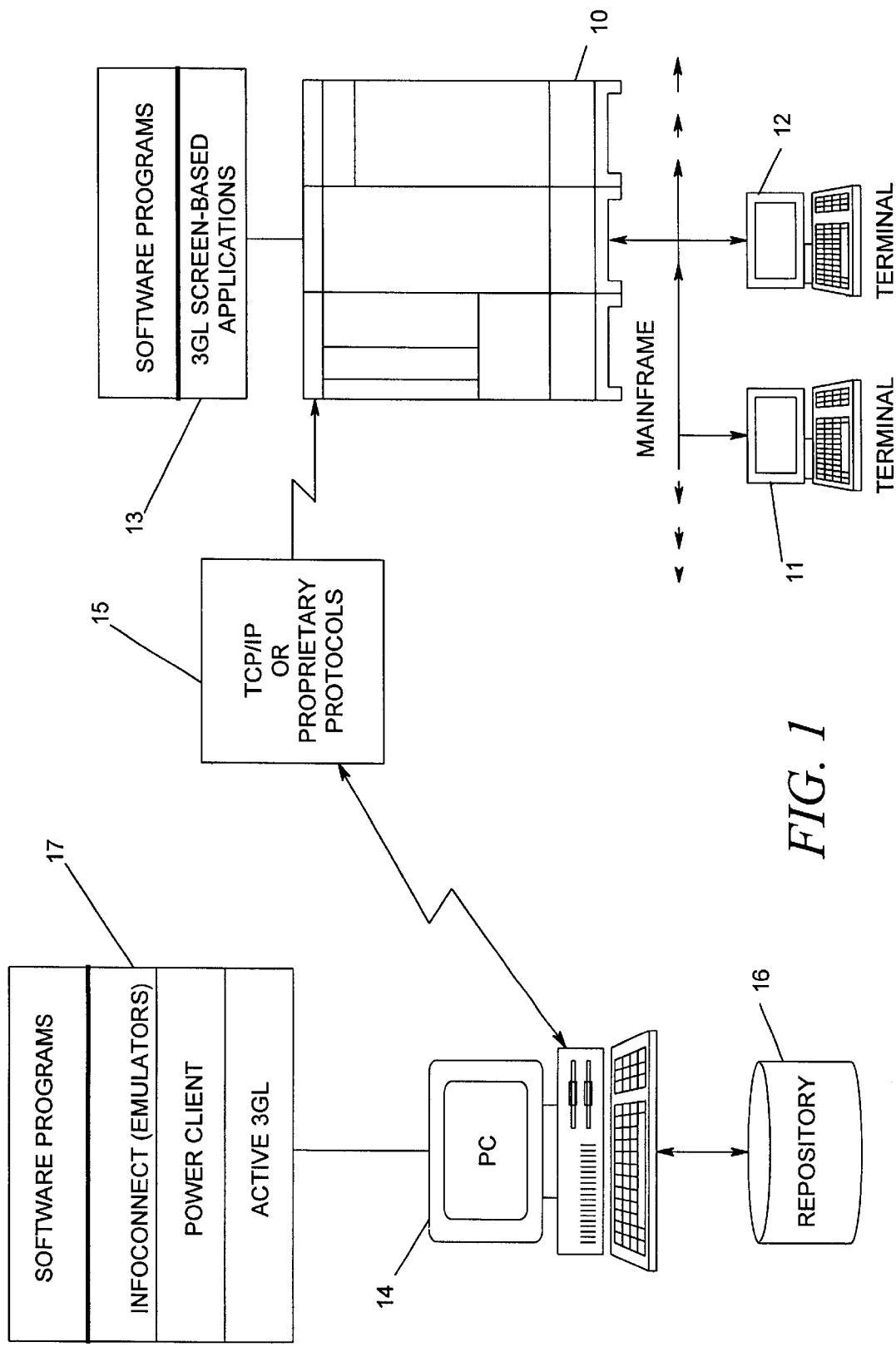
FIG. 1 is a block diagram of a computer system framework which may employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit-and byte-ordering and the transmission and error detection as well as correction of the bit stream. High-level protocols deal with message formatting, including the syntax of messages, the terminal to computer dialogue, character sets, sequencing of messages, etc.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business objects represent things, processes or events that are meaningful to the conduct of a business. Business objects make sense to business people. More specifically, a business object is a representation of an active thing in the business domain, including at least its business name and definition, attributes, behavior, relationships, rules, policies and constraints. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc.

The build phase takes the specifications and creates the implementation. That is, source files or source information is compiled or wrapped in order to create a component that will be used in the runtime system.

Referring now to FIG. 1, a system configuration is illustrated, including a mainframe 10 having coupled thereto terminals 11 and 12. Among other programs, the mainframe executes 3GL screen-based applications 13. The mainframe 10 is coupled to a PC 14 by means of TCP/IP or any of several readily available proprietary protocols 15. A repository 16, which may comprise a program stored on a disk drive, is coupled to the PC 14 in a conventional manner. The PC 14 is capable of executing software programs 17 including such legacy programs as INFOconnect (i.e., emulators), ACTIVE 3GL, and PowerClient, a proprietary program available from Unisys Corporation, the assignee hereof. INFOconnect is a software product available from Attachmate, Inc. of Cincinnati, Ohio. As will be amplified hereinafter, a user working with the PC 14 develops programs based on models stored in the repository 16 and with the use of the PowerClient or ACTIVE 3GL programs 17. One such model stored in the repository 16 may comprise certain attributes of a legacy 3GL screen captured by the discovery tool. The repository 16 includes tools for cataloging, browsing, and managing components that make up an application.

Figure 2:
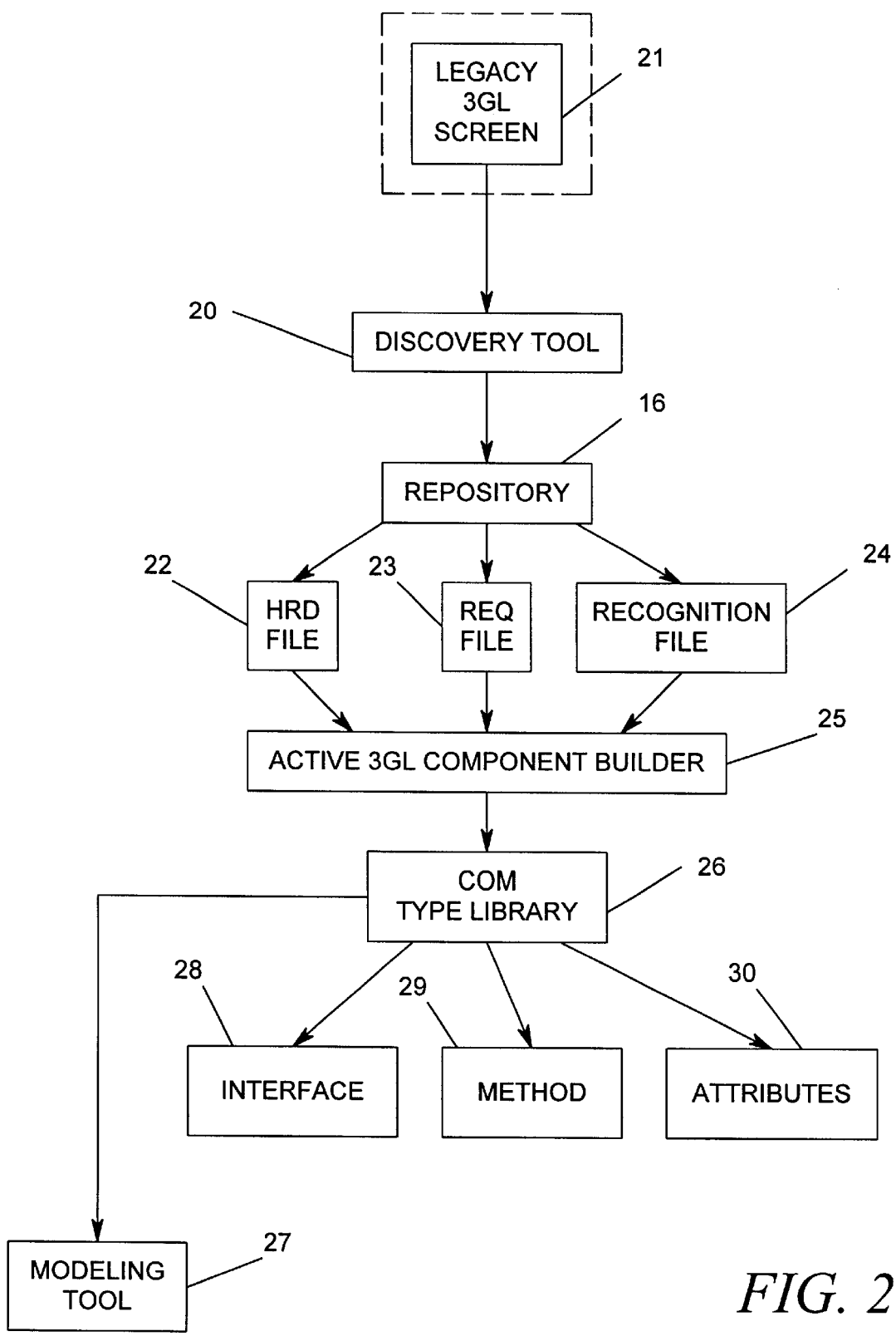
FIG. 2 is a software module block diagram of the method and system of a theoretical model of the present invention.

Referring now to FIG. 2, a block diagram of a particular embodiment of the method and system of the present invention is shown. Various modules used for building and transforming screens on a host application into software components useful in developing business-centric applications are illustrated. Within the PC 14 is a discovery tool 20, such as the Developer's Studio of the PowerClient software product, which is available from the assignee hereof. The discovery tool 20 wraps, or builds an interface to, the legacy screens, such as a legacy 3GL screen 21; and, stores certain attributes and characteristics generated by the discovery tool 20. The stored attributes are saved in partitions in the repository 16 and organized into certain files identified as an HRD (Host Reply Definition) file 22, which is a flat file that contains reply information for each field in a screen; a REQ (or Request) file 23, which is a flat file that stores information requested by the system for each field; and, a RECOG- NITION file 24, which is a flat file that associates a screen object with recognizable text. The RECOGNITION file 24 contains a list of identifiers for the screens. The HRD and REQ files are used to build type libraries that contain detailed information about a screen display.

The files 22, 23 and 24 are used by component builder 25, which comprises the method of the present invention. As a result of executing the component builder 25, using the files 22, 23 and 24, a COM (Component Object Model) type library 26, is generated. COM is defined as a specification that components follow to ensure inter-operation. The type library 26 may be used as inputs to a modeling tool 27; or it may be separately provided for other uses in the form of interfaces 28, methods 29 and attributes 30.

Figure 3:
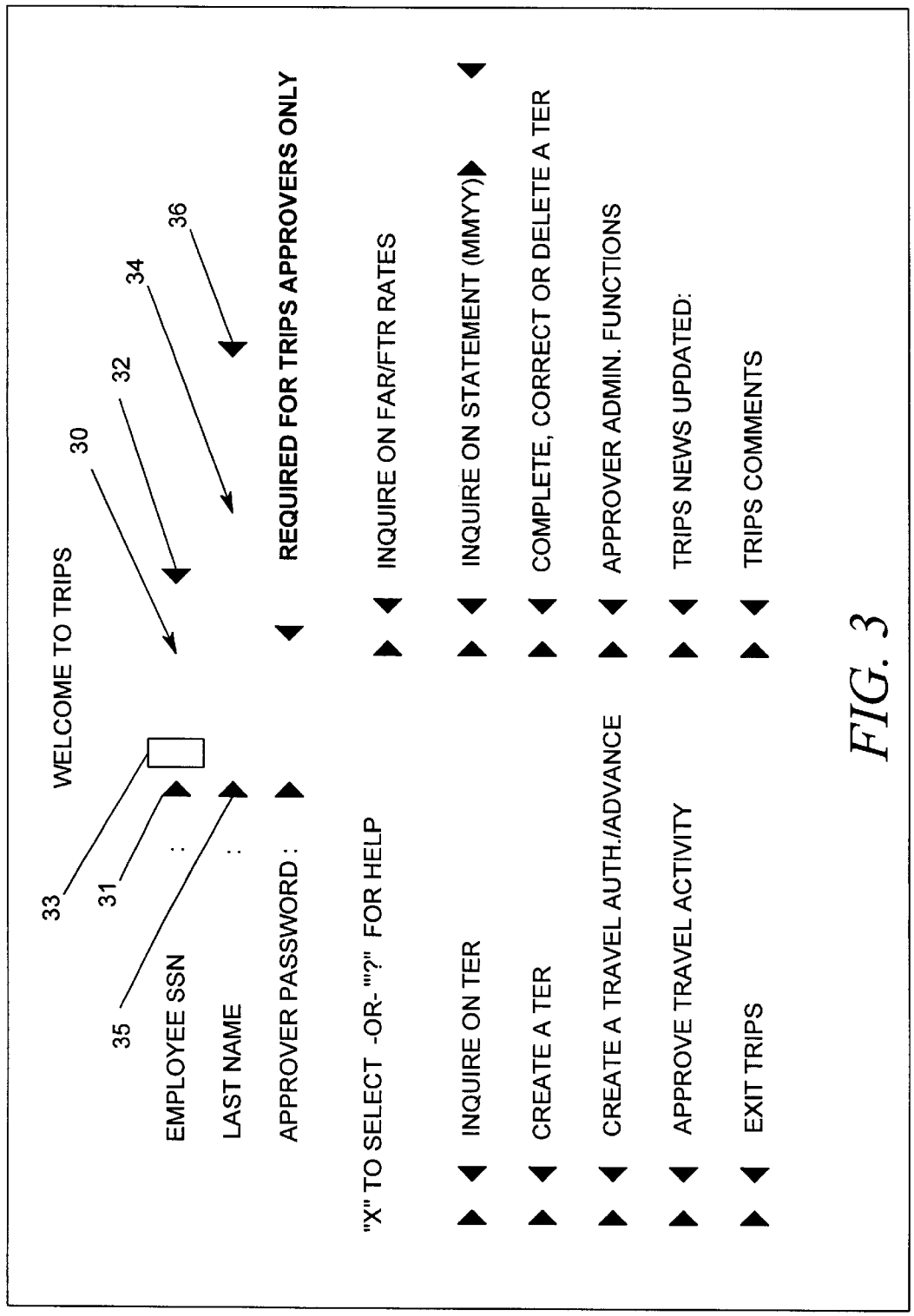
FIG. 3 is a print of a computer screen display from a MAPPER screen-based application screen for TRIPS, a report for tracking employee expenses, which screen is convertible by using the method of the present invention.

Referring now to FIG. 3, a print of a screen display of a screen for an exemplary 3GL legacy application is illustrated. When a client user calls up the INFOconnect and logs onto the server and specifies TRAVEL, this particular screen entitled TRIPS appears on the screen. It is a typical screen to be completed by an employee of an organization for reimbursement of travel expenses. Each field of this screen is depicted by a space between opposing arrowheads. For example, the field entitled EMPLOYEE SSN is that space 30 between opposing arrowheads 31 and 32, and includes a display screen cursor 33. The next field LAST NAME is that space 34 between opposing arrowheads 35 and 36. The remaining fields of the screen are similarly depicted. There are a total of fifteen (15) fields on this screen.

Preparatory to modifying the TRIPS screen using the method of this invention, the user captures this screen using the combined facilities of the INFOconnect Emulator and the PowerClient Development Studio (PDS). The user then creates Data Names for each field of the screen. HRD and REQ file syntax will contain each of the Data Names created. For example, for the screen shown in FIG. 3, the following information will be created and stored in the development repository 12 and is to be used in the SCL generation process. The user would indicate the data entry fields and the static text in the screen.

A sample HRD FILE is as follows:

```
replyA
15   ; # reply fields
field 1
1 20 3 0 0
field 2
2 1 1 81 0
field 3
3 10 1 82 0
field 4
4 5 1 92 0
...
field 15
15 12 2 60 0
2
3 1   ; Action 1 : Emulator: Set_Cursor
1     ; base
321   ; Offset start of fifth line
0     ; field not used
3 1   ; Action 2 : Emulator: Set_Cursor
481
par2
par3
```

And a sample. REQ is as follows:

```
request!
1 0 0       ; cursor posn
257 2 15      ; xmit # fields timeout
requestField1
1 1 70 0 10 1 0 0
requestField2
2 1 150 0 13 1 0 0
test constant
2     ; # of replies
replyC ; reply 1
1 1   ; recog field list has 1 message part
      and 1 recog field
COMPUTER
F x 1 481 0 1 0 0
replyD       ; reply 2
1 2   ; 1 message part and 2 recog fields
MELBOURNE
S x 1 1 0 1 1920 0
COMPUTER
S x 1 1 0 1 1920 0
0     ; no preFormat action list
1     ; postFormat Action list has 1 action
3 1   ; Action 1 : Emulator: Set_Cursor
1     ; base
1920 ; offset end of PS
0     ; fieldId not used
0     ; no postRequest action list
```

A sample Recognition File Definition, which defines the recognition criteria for each screen in the 3GL application, not the screens themselves, is as follows:
ApplicationName
Screens
ScreenComponent1Identifier
MessageParts #RecognitionCriteria
StandAlone
RecognitionCriteria1
RecognitionCriteria2
. . .
. . .
Screen Component2Identifier
. . .
. . .
Where a RecognitionCriteria is defined over 2 lines as:
RecognitionCriteria Text (string)
SNX Bs Os Fs Be Oe Fe
and
S is 'S' or 'F' indicating Search or Fixed location
N is 'N' or 'Y' indicating whether or not to negate search
X is reserved space and should be 'X'
Start Location:
Bs=1,2,3 or 4 indicating the Base location of text
Os is the offset from the base in the emulator
Fs is a field number
End Location:
Specified in the same manner as Start Location
EXAMPLE:
3GL TESTAS
5
{F5715438-6DC2-11D2-B459-00E081101DFB}
1 1 S
MARC -
FYX 1 11 0 1 1920 0
{F5715439-6DC2-11D2-B459-00E081101DFB}

```
1 1 S
TEST A-SERIES APPLICATION
FYX 1 102 0 1 1920 0
{F571543A-6DC2-11D2-B459-00E081101DFB}
1 1 S
NUMERIC FIELDS SCREEN
FYX 1 102 0 1 1920 0
{F571543B-6DC2-11D2-B459-00E081101DFB}
1 1 S
Video Attribute Test
FYX 1 102 0 1 1920 0
{F571543C-6DC2-11D2-B459-00E081101DFB}
1 1 S
Busy Screen
FYX 1 102 0 1 1920 0
```

Figure 4:
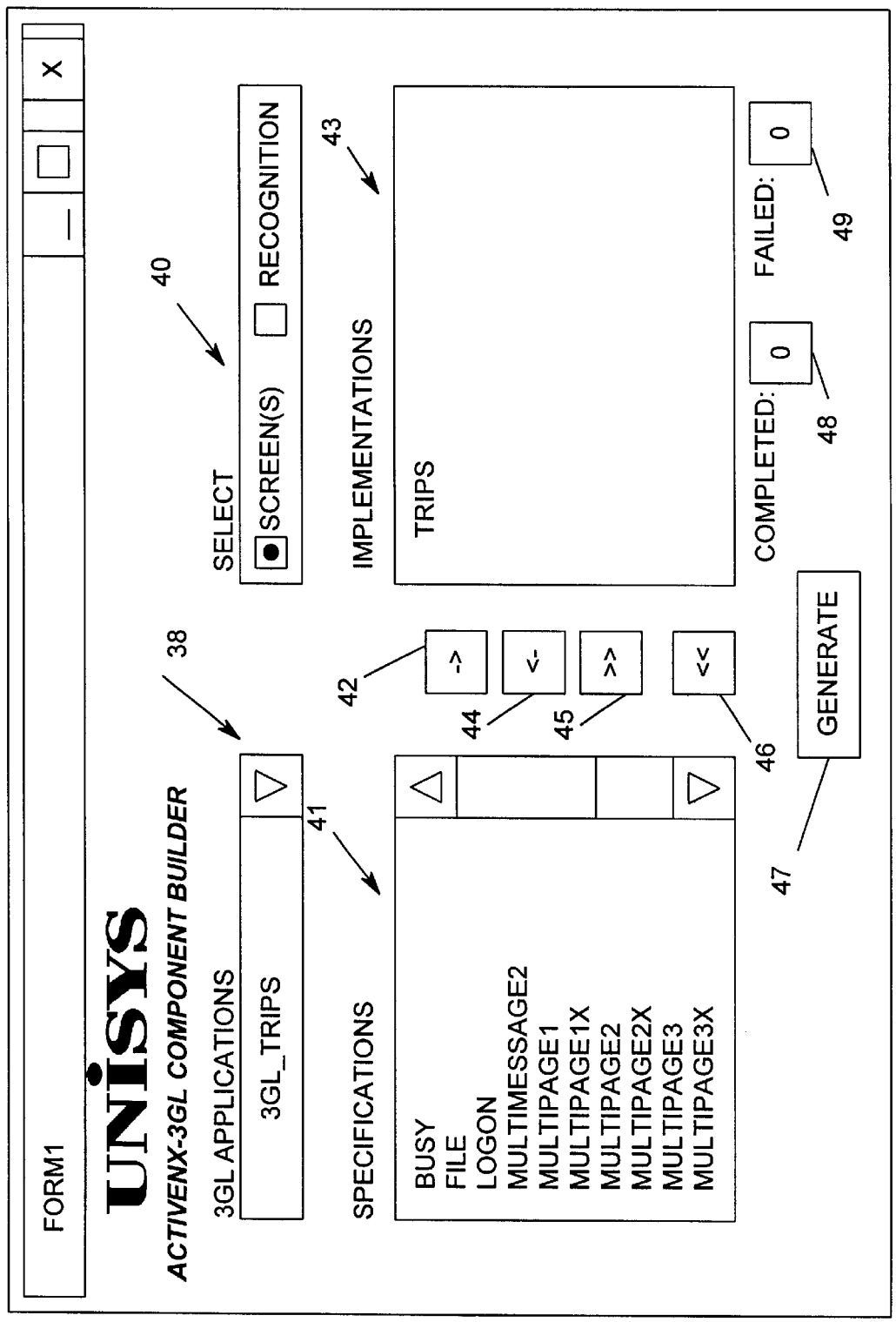
FIGS. 4 is a print of the User Interface screen shown during use of the present invention.

Referring now to FIG. 4, a print of the User Interface for the present invention (i.e., the component builder). The process is begun by using the pull-down menu 38. The menu displays the 3GL applications currently stored in the repository. Next, the user selects the type of specifications to retrieve from the repository, screen or recognition. If the user selects a screen (window 40) specification then all screen specifications for the selected 3GL application are listed in a window 41. If the user selects recognition (window 40), then the recognition specification is displayed in window 41. A button 42 is used to select the specification(s) listed in the window 41 for implementation in window 43. A button 44 is used to select implementations in the window 43 for specification in the window 41. A button 45 is used to select all the specifications in the window 41 for implementations in the window 42, and a button 46 is used for selecting all the implementations in the window 43 for specification in the window 41.

The wrapping process begins by selecting on a generate button 47. Each implementation listed in the window 43 will be wrapped (for screens) or extracted from the repository 16 into a flat file (recognition). A window 48 displays the number of successful wrapper completions for those implementations listed in the window 43. A window 49 displays the number of unsuccessful wrapped completions for those implementations in the window 43.

The Interface Description Language of the generated components type library, which represents the TRIPS screen is as follows:

```
// Copyright (c) 1998, Unisys Corporation.
// Generated .IDL file (by the OLE/COM Object
   Viewer)
//
// typelib filename: <could not determine
      filename>
// Forward declare all types defined in this
      typelib
      dispinterface IUISTRIPS;
      [
      uuid (FAB0O3D6-6E6A-11D2-B456-
      00E081101919),
      version(1.0),
      helpstring("TRIPS Type Library")
      ]
      library UIS_TRIPS
      {
         // TLib : OLE Automation : {00020430-
         0000-0000-C000-000000000046},
         importlib ("STDOLE2.TLB");
         [
            uuid (B7856DB0-2BED-11D2-96B3-
            0000C0384CF4),
         ]
            dispinterface IUISTRIPS {
            properties:
            methods:
         [id(00000000),
            custom ({6AC65413-32D7-11D2-96B5-
            0000C0384CF4}, "2"),
            custom ({6AC65412-32D7-11D2-96B5-
            0000C0384CF4), "15"),
            custom ({6AC65411-32D7-11D2-96B5-
            0000C0384CF4}, "2.1"),
            custom ({6AC65410-32D7-11D2-96B5-
            0000C0384CF4), "replyA")]
            HRESULT HrdAttrib();
            [id(00000001),
            custom ({D8B7F6AC-32D7-11D2-96B5-
            0000C0384CF4}, "0"),
            custom ({D8B7F6AB-32D7-11D2-96B5-
            0000C0384CF4}, "1"),
            custom ({D8B7F6AA-32D7-11D2-96B5-
            0000C0384CF4}, "0"),
            custom ({D8B7F6A9-32D7-11D2-96B5-
            0000C0384CF4}, "4"),
            custom ({D8B7F6A7-32D7-11D2-96B5-
            0000C0384CF4}, "15"),
            custom ({D8B7F6A6-32D7-11D2-96B5-
            0000C0384CF4}, "2"),
            custom ({D8B7F6A5-32D7-11D2-96B5-
            0000C0384CF4}, "257"),
            custom ({D8B7F6A4-32D7-11D2-96B5-
            0000C0384CF4}, "0"),
            custom ({D8B7F6A3-32D7-11D2-96B5-
            0000C0384CF4}, "0"),
            custom ({D8B7F6A2-32D7-11D2-96B5-
            0000C0384CF4}, "1"),
            custom ({D8B7F6A1-32D7-11D2-96B5-
            OOO0C0384CF4), "2.1"),
            custom ({D8B7F6A0-32D7-11D2-96B5-
            0000C0384CF4}, "request!")]
            HRESULT ReqAttrib();
            [(id(00000002),
            custom ({3D44DBBO-2BE1-11D2-96B3-
            0000C0384CF4}, "0"),
            custom ({3D44DBB2-2BE1-11D2-96B3-
            0000C0384CF4), "0"),
            custom ({3D44DBB1-2BE1-11D2-96B3-
            0000C0384CF4}, "3"),
            custom ({3D44DBB8-2BE1-11D2-96B3-
            0000C0384CF4}, "20"),
            custom ({3D44DBB9-2BE1-11D2-96B3-
            0000C0384CF4}, "1")]
            HRESULT field1();
         [id(00000003),
            custom ({3D44DBB0-2BE1-11D2-96B3-
            0000C0384CF4}, "0"),
            custom ({3D44DBB2-2BE1-11D2-96B3-
            0000C0384CF4}, "81"),
            custom ({3D44DBB1-2BE1-11D2-96B3-
            0000C0384CF4}, "1"),
            custom ({3D44DBB8-2BE1-11D2-96B3-
            0000C0384CF4}, "1"),
            custom ({3D44DBB9-2BE1-11D2-96B3-
            0000C0384CF4), "2")]
            HRESULT field2();
            [id(00000016),
            custom ({3D44DBB0-2BE1-11D2-96B3-
            0000C0384CF4}, "0"),
            custom ({3D44DBB2-2BE1-11D2-96B3-
            0000C0384CF4}, "60"),
            custom ({3D44DBB1-2BE1-11D2-96B3-
            0000C0384CF4}, "2"),
            custom ({3D44DBB8-2BE1-11D2-96B3-
            0000C0384CF4}, "12"),
            custom ({3D44DBB9-2BE1-11D2-96B3-
            0000C0384CF4}, "15")]
            HRESULT field15();
            [id(00000017),
            custom ({3D44DBB6-2BE1-11D2-96B3-
            0000C0384CF4), "0"),
            custom ({3D44DBBA-2BE1-11D2-96B3-
```

-continued

```
           0000C0384CF4}, "1"),
      custom ({3D44DBB8-2BE1-11D2-96B3-
           0000C0384CF4}, "10"),
      custom ({3D44DBB9-2BE1-11D2-96B3-
           0000C0384CF4}, "0"),
      custom ({3D44DBB2-2BE1-11D2-96B3-
           0000C0384CF4}, "70"),
      custom ({3D44DBB1-2BE1-11D2-96B3-
           0000C0384CF4}, "1"),
      custom ({3D44DBB3-2BE1-11D2-96B3-
           0000C0384CF4}, "1")]
    HRESULT requestField1 ();
       [id(00000018),
      custom ({3D44DBB6-2BE1-11D2-96B3-
           0000C0384CF4}, "0"),
      custom ({3D44DBBA-2BE1-11D2-96B3-
           0000C0384CF4}, "1"),
      custom ({3D44DBB8-2BE1-11D2-96B3-
           0000C0384CF4}, "13"),
      custom ({3D44DBB9-2BE1-11D2-96B3-
           0000C0384CF4}, "0"),
      custom ({3D44DBB2-2BE1-11D2-96B3-
           0000C0384CF4}, "150"),
      custom ({3D44DBB1-2BE1-11D2-96B3-
           0000C0384CF4}, "1"),
      custom ({3D44DBB3-2BE1-11D2-96B3-
           0000C0384CF4}, "2")]
    HRESULT requestField2 ();
  };
  [
    uuid (B7856DB1-2BED-11D2-96B3-
       0000C0384CF4)
    coclass CTRIPS {
    [default] dispinterface IUISTRIPS;
    };
  };
};
```

Figure 5A:
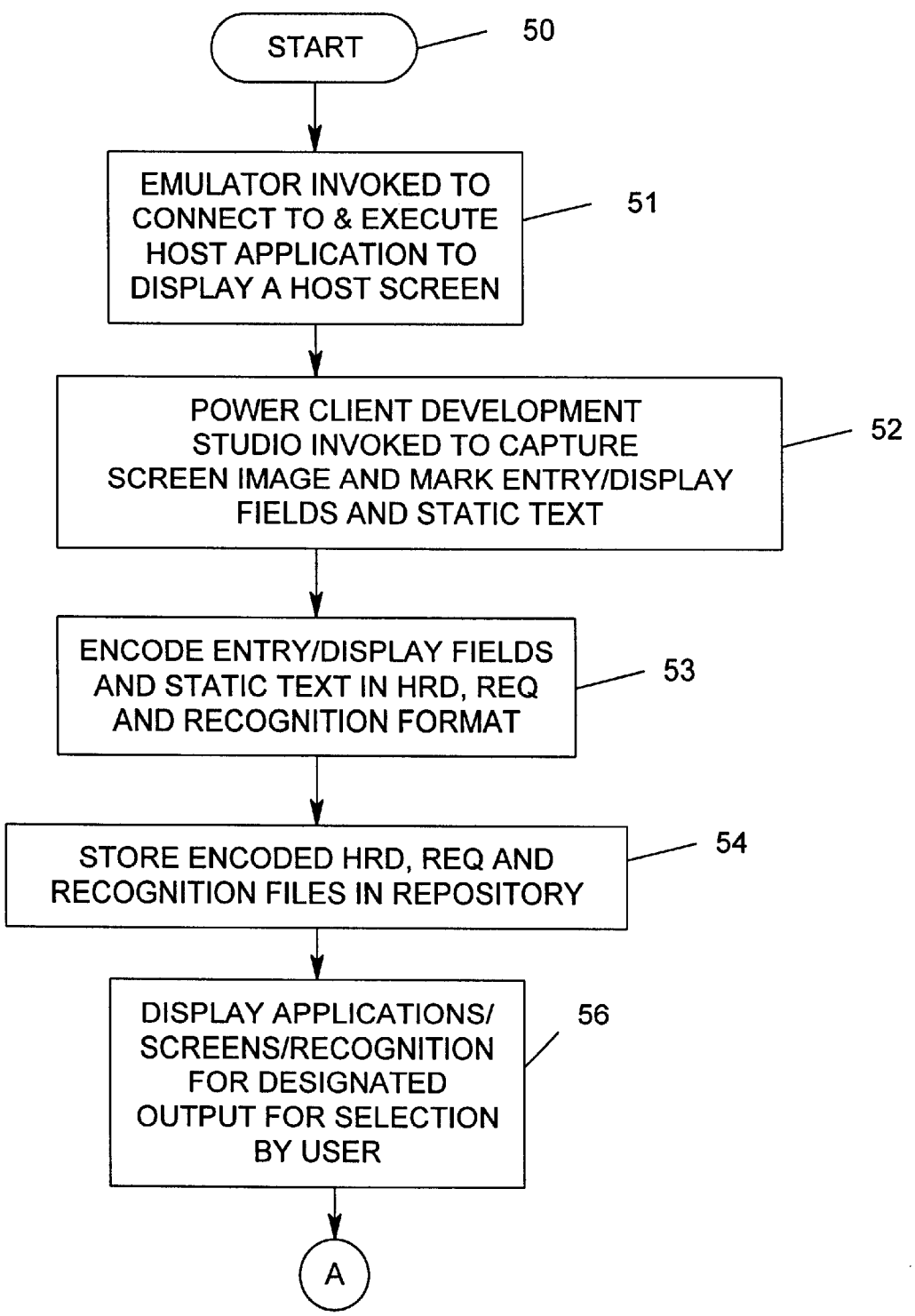
FIGS. 5A through 5C combined form a flow chart of the disclosed embodiment of the present invention.

Referring now to FIG. 5A, the first of a three-sheet illustration of the process of the present invention is shown. The process begins with a start bubble 50 followed by a step of invoking the emulator to connect to and execute host applications to display a host screen (block 51). Next, the PowerClient Development Studio is invoked in order to capture the screen image and mark the entry/display fields and the recognition static text (block 52). Following this, the entry/display fields and the static text are encoded into Host Request/Reply and Recognition files, respectively, (block 53). The encoded files are then stored in the repository 16 (block 54).

It is pointed out at this juncture of the description that there are two functions that a software component can perform: first, it can build a recognition component; and, second it can build a screen component. The applications/screens/recognition (i.e., specifications) output are displayed (block 56). The user is now able to choose an application, choose a screen/recognition file and choose a designated output. The process illustration continues in FIG. 5B at a connector A.

Figure 5B:
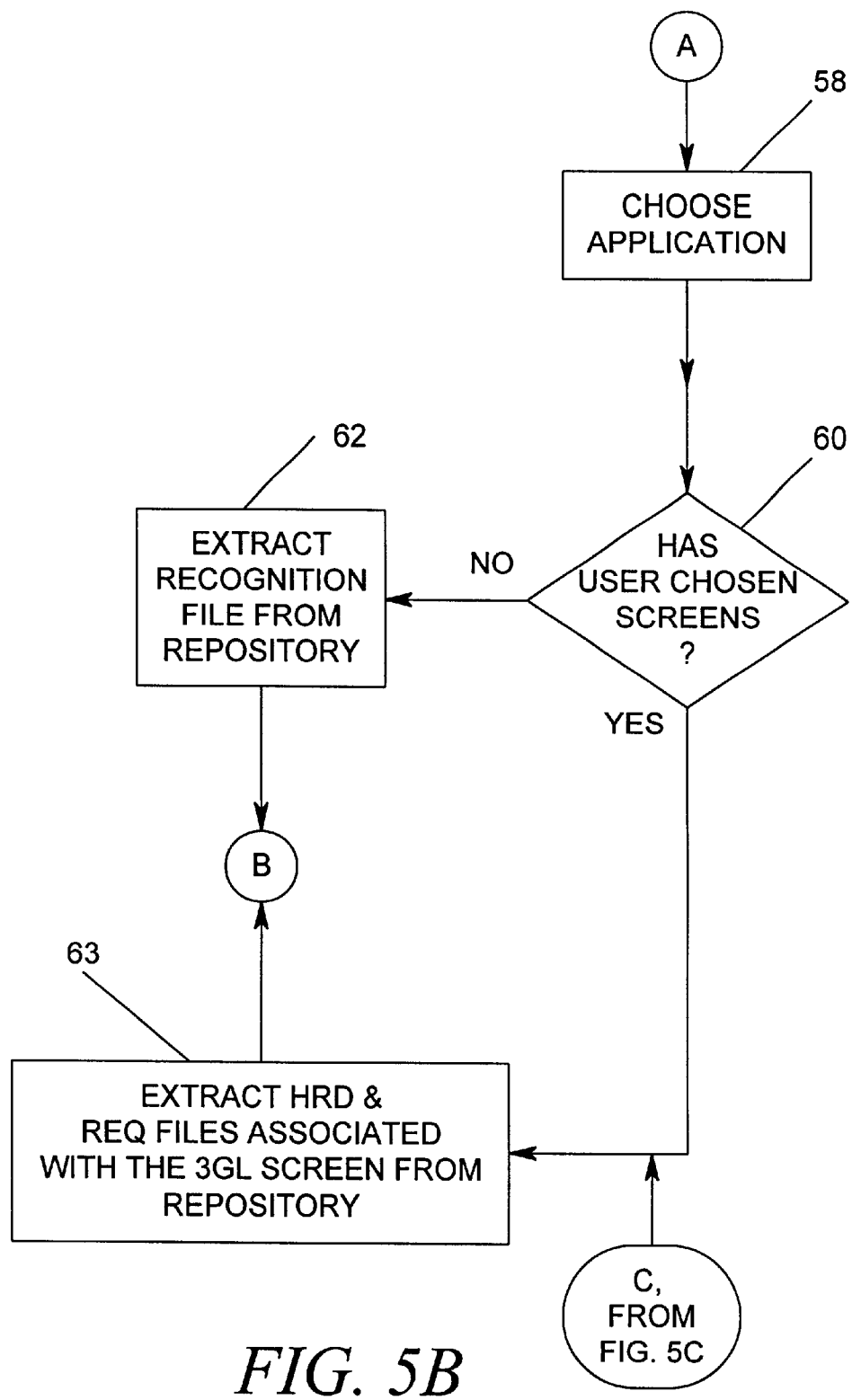

Referring now to FIG. 5B at the connector A, the user is offered an opportunity to choose an application (block 58). Next, an inquiry is made as to whether or not the user has chosen screens (diamond 60). If the answer to this inquiry is no, then the recognition files are extracted from the repository (block 62). On the other hand, if the answer to the inquiry in the diamond 60 is yes, then the HRD and REQ files associated with the 3GL screen are extracted from the repository (block 63). Once step 61 or 63 has been completed, then the process continues in FIG. 5C at a connector B.

Figure 5C:
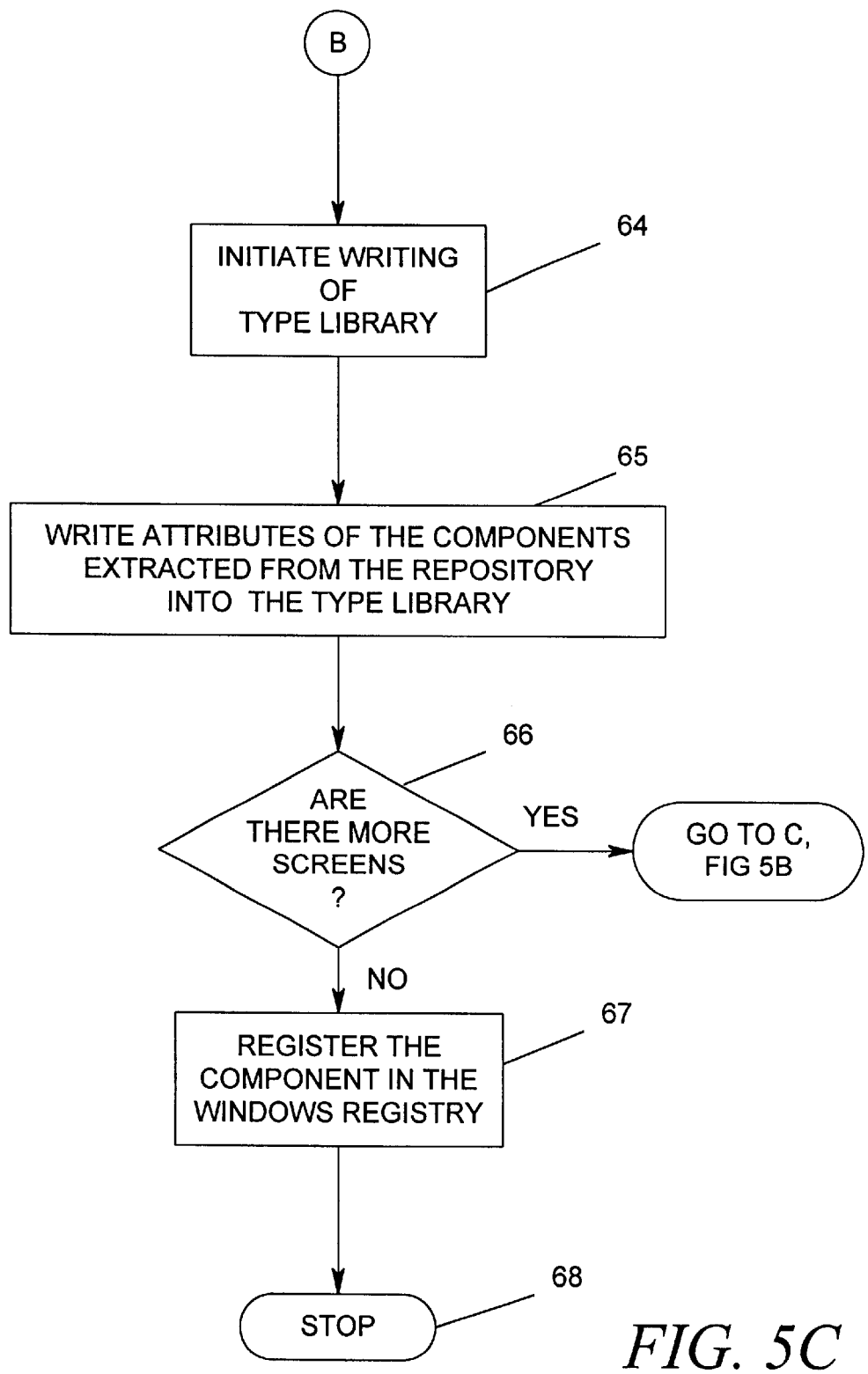

Referring now to FIG. 5C at the connector B, writing of the type library is initiated (block 64). Next, the attributes of the specifications extracted from the repository are written into the type library (block 65). When the attributes and characteristics of the screen are written into a type library, the screen is made into a component. Each characteristic of the screen is then accessible through standard component interfaces. Following these steps, an inquiry is made as to whether or not there are more screens (diamond 66). If the answer to this inquiry is yes, then a return is made back to the block 63 (FIB. 5B) as denoted by a connector C. On the other hand, if there are no more screens, then the component is registered in the windows registery (block 66). In order to be recognized by other applications/components, a component must be registered in a table that other applications/components can read or access. Such a table is known as a windows registery. Finally, the process stops (bubble 67).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having coupled thereto a repository for storing data, a method implemented by said computer system for building and transforming data defining screen applications into software components useful in developing business-centric applications, said method comprising the steps of:

a. encoding display, entry fields and static text of a screen application (screen data) into Host Reply Definition (hereafter HRD), Request (hereafter REQ) and recognition files, respectively;

b. storing said HRD, REQ and recognition files from the previous step in said repository;

c. using a graphical user interface program for building and transforming the HRD and REQ files stored in said repository into components;

d. extracting from said repository said HRD, REQ and recognition files associated with said screen application;

e. writing attributes of said HRD and REQ files into a type library, thereby forming said software components;

f. storing said recognition file in a directory structure independent of said repository; and, g. registering said components into a registry for recognition by other applications and components.

2. The method as in claim 1 further including the step of discovering legacy 3GL screen applications and creating specifications of said screen applications and of said recognition files.

3. The method as in claim 2 wherein said step of discovering further comprises the steps of navigating to said legacy 3GL screen applications by the use of an emulator, thereby capturing data representative of said screens, and storing said data in said repository.

4. The method as in claim 1 wherein said step of encoding further comprises structuring said screen data into a format that can be interpreted by applications in a manner defined by said HRD, REQ and recognition files.

5. The method as in claim 1 further comprising the step of using a graphical user interface for building and transforming said recognition file of said screen application stored in said repository.

6. The method as in claim 1 wherein said step of using a graphical user interface program further comprises the steps of:
   a. selecting a first one of said 3GL screen applications stored in said repository;
   b. selecting a first screen associated with said first 3GL screen application;
   c. generating said software components representative of said first screen application.

7. The method as in claim 1 wherein said step of extracting further comprises interpreting said screen data in a manner defined by said HRD, REQ and recognition files.

8. The method as in claim 1 wherein said type library contains information comprising screen name, field size, field type (for input/output), field name and field position of an associated 3GL screen in a manner defined by a COM specification.

9. A storage medium encoded with machine-readable computer program code for building and transforming data defining 3GL screen applications into software components useful in developing business-centric applications, wherein, when the computer program code is executed by a computer system having coupled thereto a repository for storing data, the computer performs the steps of:
   a. encoding display, entry fields and static text of a screen application (screen data) into Host Reply Definition (hereafter HRD), Request (hereafter REQ) and recognition files, respectively;
   b. storing said HRD, REQ and recognition files from the previous step in said repository;
   c. using a graphical user interface program for building and transforming the HRD and REQ files stored in said repository into components;
   d. extracting from said repository said HRD, REQ and recognition files associated with said screen application;
   e. writing attributes of said HRD and REQ files into a type library, thereby forming said software components;
   f. storing said recognition file in a directory structure independent of said repository; and,
   g. registering said components into a registry for recognition by other applications and components.

10. A storage medium in accordance with claim 9 further including the step of discovering legacy 3GL screen applications and creating specifications of said screen applications and of said recognition files.

11. The storage medium in accordance with claim 10 wherein said step of discovering further comprises the steps of navigating to said legacy 3GL screen applications by the use of an emulator, thereby capturing data representative of said screens, and storing said data in said repository.

12. The storage medium in accordance with claim 9 wherein said step of encoding further comprises structuring said screen data into a format that can be interpreted by applications in a manner defined by said HRD, REQ and recognition files.

13. The storage medium in accordance with claim 9 further comprising the step of using a graphical user interface for building and transforming said recognition file of said screen application stored in said repository.

14. The storage medium in accordance with claim 9 wherein said step of using a graphical user interface program further comprises the steps of:
   a. selecting a first one of said 3GL screen applications stored in said repository;
   b. selecting a first screen associated with said first 3GL screen application;
   c. generating said software components representative of said first screen application.

15. The storage medium in accordance with claim 9 wherein said step of extracting further comprises interpreting said screen data in a manner defined by said HRD, REQ and recognition files.

16. The storage medium in accordance with claim 9 wherein said type library contains information comprising screen name, field size, field type (for input/output), field name and field position of an associated 3GL screen in a manner defined by a COM specification.

17. In a computer system having coupled thereto a repository for storing data, an apparatus in said computer system for building and transforming data defining screen applications into software components useful in developing business-centric applications, said apparatus comprising:
   a. means for encoding display, entry fields and static text of a screen application (screen data) into HRD, REQ and recognition files, respectively;
   b. means for storing said Host Reply Definition (hereafter HRD), Request (hereafter REQ) and recognition files in said repository;
   c. a graphical user interface program disposed for building and transforming the HRD and REQ files stored in said repository into components;
   d. means for extracting from said repository said HRD, REQ and recognition files associated with said screen application;
   e. a type library containing attributes of said HRD and REQ files disposed for forming said software components;
   f. means for storing said recognition file in a directory structure independent of said repository; and,
   g. a register means disposed for storing said components for recognition by other applications and components.

18. The apparatus as in claim 17 wherein said type library contains information comprising screen name, field size, field type (for input/output), field name and field position of an associated 3GL screen in a manner defined by a COM specification.

* * * * *